US008761766B2

United States Patent
Cho et al.

(10) Patent No.: US 8,761,766 B2
(45) Date of Patent: Jun. 24, 2014

(54) METHOD FOR TRANSMITTING AND RECEIVING BROADCAST SERVICE INFORMATION AND USER EQUIPMENT FOR BROADCAST SERVICE

(75) Inventors: Jai-Hyung Cho, Daejeon (KR); Hyunsuk Roh, Daejeon (KR); Sang-Ho Lee, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 491 days.

(21) Appl. No.: 12/609,069

(22) Filed: Oct. 30, 2009

(65) Prior Publication Data

US 2010/0112978 A1    May 6, 2010

(30) Foreign Application Priority Data

Oct. 30, 2008   (KR) .......................... 10-2008-0107312

(51) Int. Cl.
*H04W 4/00* (2009.01)
*H04W 72/00* (2009.01)

(52) U.S. Cl.
USPC ...................................... 455/435.1; 455/450

(58) Field of Classification Search
USPC ......................................... 455/435, 457, 436
See application file for complete search history.

(56) References Cited

U.S. PATENT DOCUMENTS

| 2004/0116134 A1* | 6/2004 | Maeda et al. ................. 455/457 |
| 2006/0224301 A1* | 10/2006 | Sakagami et al. ............ 701/200 |
| 2008/0032721 A1* | 2/2008 | MacDonald et al. ......... 455/466 |
| 2009/0037097 A1* | 2/2009 | Cho et al. ...................... 701/207 |

FOREIGN PATENT DOCUMENTS

| KR | 1999-0082835 | 11/1999 |
| KR | 10-2003-0009238 A | 1/2003 |
| KR | 10-2003-0080656 A | 10/2003 |
| KR | 2003-0087284 | 11/2003 |
| KR | 2006-0106724 | 10/2006 |
| KR | 1020060113171 A | 11/2006 |
| KR | 1020070078161 A | 7/2007 |

OTHER PUBLICATIONS

Discussion Paper on PBS Section 5.6, Jaihyung Cho, 3GPP TSG-SA1 #44, S1-090074, Feb. 2-6, 2009, San Antonio, Texas, USA.

* cited by examiner

*Primary Examiner* — Michael Faragalla

(74) *Attorney, Agent, or Firm* — H.C. Park & Associates, PLC

(57) ABSTRACT

Provided are a method for transmitting and receiving broadcasting service information and a mobile station for a broadcasting service. The method for transmitting broadcasting service information at a base station, includes registering a mobile station in a first cell, wherein the first cell is a cell managed by the base station, receiving vehicle related information from the mobile station mounted on a vehicle, and broadcasting the received vehicle related information to target cells.

17 Claims, 3 Drawing Sheets

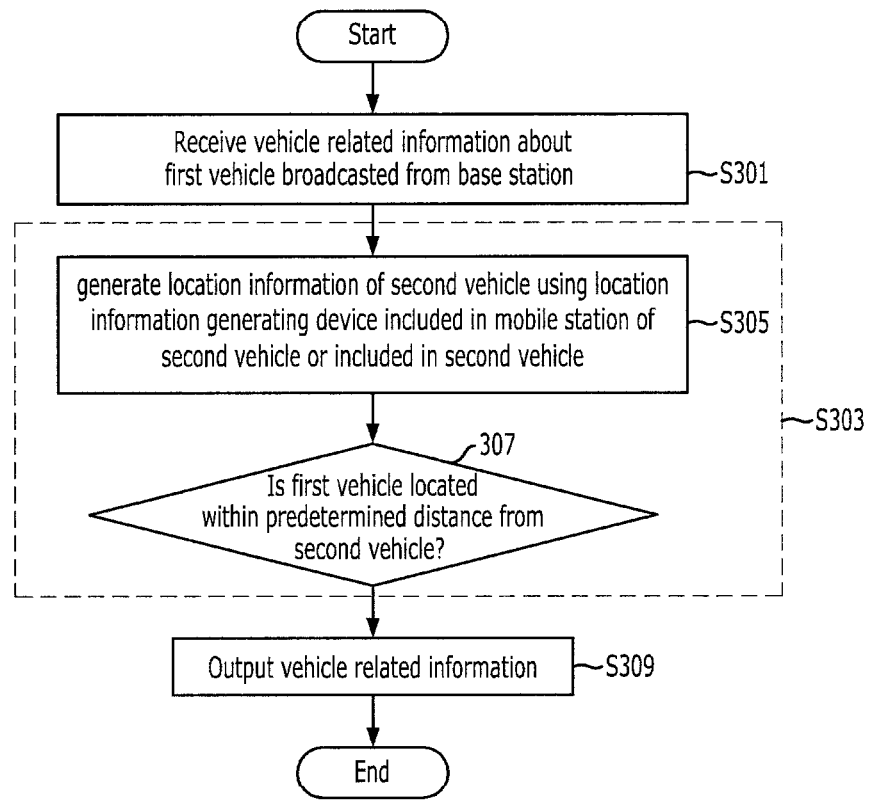
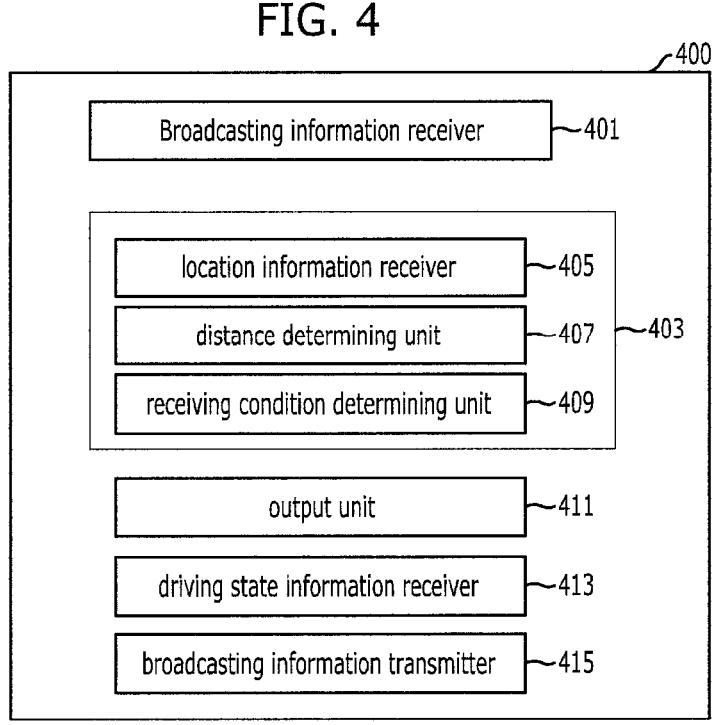

METHOD FOR TRANSMITTING AND RECEIVING BROADCAST SERVICE INFORMATION AND USER EQUIPMENT FOR BROADCAST SERVICE

This application claims priority from and the benefit of Korean Patent Application No. 10-2008-0107312, filed on Oct 30, 2008, which is hereby incorporated by reference for all purposes as if fully set forth herein.

BACKGROUND OF THE INVENTION

1. Field of the Invention

The present invention relates to a method for transmitting and receiving broadcasting service information and a mobile station for a broadcasting service.

2. Description of Related Art

Due to the development of mobile communication technology and the abrupt increment of mobile communication service subscribers, various types of mobile communication services have been introduced. For example, it has become common to use a short message service (SMS) or a voice message service (VMS) to transfer a text message or a voice message to the other party using a mobile station or user equipment.

Such a message service may be provided from one base station to mobile stations in a corresponding cell as a broadcasting service type. A multicast service or a broadcast service is a point-to-multipoint service that transmits data from one source to a plurality of receivers. For example, a base station broadcasts disaster alarm messages to a plurality of mobile stations in a corresponding cell. For another example, a base station transmits a broadcasting service for informing a plurality of mobile stations in a corresponding cell of a current traffic condition.

However, such a traffic condition message according to the related art informs only simple traffic condition such as traffic jam on a particular road or street. That is, the traffic condition message does not provide information about whether an accident is occurred at a predetermined area. Further, the traffic condition message does not warn a driver of black spots for traffic accidents. Lately, many methods have been introduced to reduce vehicle related accidents such as accidents between vehicles and accidents between a vehicle and a pedestrian. As one of the methods, electric sensors are mounted on a front part or a rear part of a vehicle and information about vehicles in front of or on the back of the sensor mounted vehicle is collected. Using the collected information, a driver is enabled to detect passing or following vehicles with their speeds and directions. However, such an electric sensor based method according to the related art cannot enable a driver to detect a dead zone such as a sharp corner or to understand overall traffic flow because it handles information about only vehicles in the front of or on the back of the sensor mounted vehicle.

SUMMARY OF THE INVENTION

An embodiment of the present invention is directed to providing a method for transmitting and receiving broadcasting service information and a mobile station for a broadcasting service, which enable a driver to safely and conveniently drive a vehicle and reduce an accident occurrence probability.

In accordance with an aspect of the present invention, there is provided a method for transmitting broadcasting service information at a base station including registering a mobile station in a cell, wherein the cell is a cell managed by the base station, receiving vehicle related information from the mobile station included in a vehicle, and broadcasting the received vehicle related information to target cells.

In accordance with another aspect of the present invention, there is provided a method for transmitting broadcasting service information at a base station, including registering a mobile station in a cell, wherein the cell is a cell managed by the base station, receiving user related information about a user of the mobile station generated by and transmitted from the mobile station, and broadcasting the user related information to target cells, wherein the user related information includes at least one of user location information of the user, user speed information of the user, and message information generated by a request of the user.

In accordance with still another aspect of the present invention, there is provided a method for receiving broadcasting service information at a mobile station, including receiving vehicle related information about a first vehicle broadcasted from a base station, determining validity of the vehicle related information based on a predetermined output condition, and outputting the received vehicle related information according to the determination result.

In accordance with yet another aspect of the present invention, there is provided a method for receiving broadcasting service information, including generating a first user related information about a first user of a first mobile station, transmitting the first user related information to a base station, and receiving second user related information about a second user of a second mobile station, which is broadcasted from the base station, wherein the first user related information and the second user related information include at least one of user location information, user speed information, and message information of the first user and the second user.

In accordance with still and yet another aspect of the present invention, there is provided a mobile station including a broadcasting information receiver configured to receive first vehicle related information about a first vehicle, broadcasted from a base station, a data processor configured to determine validity of the first vehicle related information according to predetermined output condition, and an output unit configured to output the first vehicle related information according to the determination result.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

BRIEF DESCRIPTION OF THE DRAWINGS

FIG. 3 is a flowchart for a method for receiving broadcasting service information in accordance with an embodiment of the present invention.

FIG. 4 is a diagram illustrating a mobile station for a broadcasting service in accordance with an embodiment of the present invention.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
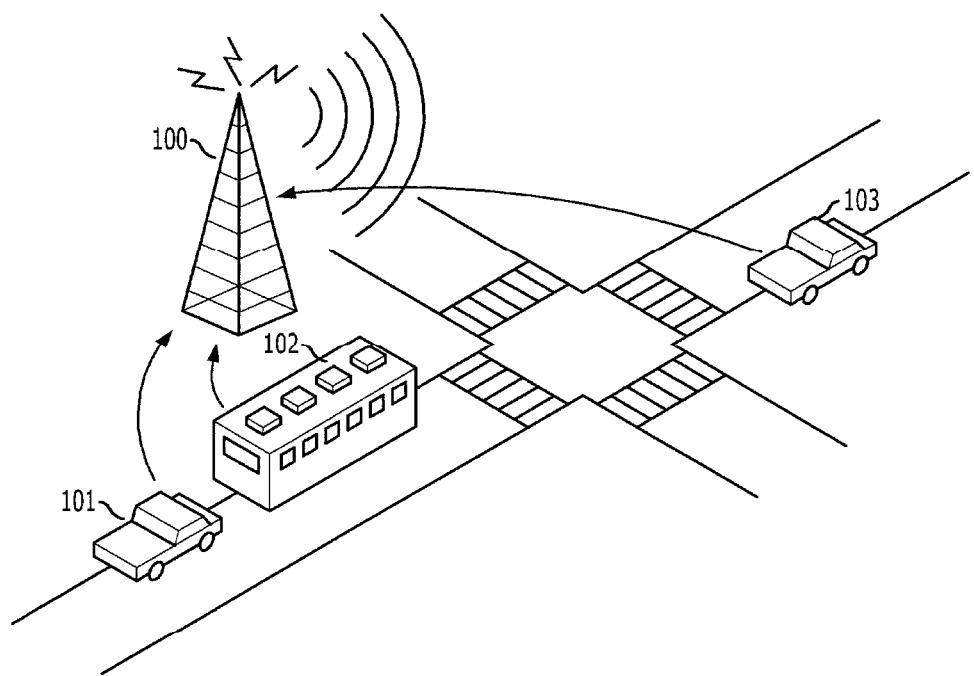
FIG. 1 is a diagram for describing a method for transmitting and receiving broadcasting service information in accordance with an embodiment of the present invention.

FIG. 1 is a diagram for describing a method for transmitting and receiving broadcasting service information in accordance with an embodiment of the present invention.

As shown in FIG. 1, a cell includes first to third vehicles 101 to 103 that a base station 100 provides a service. Each one of the first to third vehicles 101 to 103 includes a mobile station. That is, the first to third vehicles 101 to 103 may be referred as mobile station users.

According to the present embodiment, the mobile station transmits vehicle related information to the base station 100. The base station 100 receives the vehicle related information from the mobile stations and broadcasts the received vehicle related information to mobile stations in a corresponding cell. The vehicle related information may be vehicle location information, vehicle driving state information and message information generated according to a request of a mobile station user.

In more detail; the vehicle location information may be generated by a location information generating device mounted on the mobile station or the vehicle. The vehicle driving state information may be generated by various sensors mounted on the vehicle. For example, the vehicle driving state information may be information about a speed of a vehicle or a driving direction of a vehicle, which are measured by sensors. The message information may be a text message, a video message, or a voice message, which is generated according to a request of a mobile station user. That is, the mobile station generates accident related message in response to a request of the mobile station user and transmits the generated accident related message to the base station 100.

For example, a driver of the first vehicle 101 can be aware of driving states and locations of the second and third vehicles 102 and 103 through the vehicle related information. The driver of the first vehicle 101 can detect whether the second vehicle 102 or the third vehicle 103 has an accident or not by detecting the driving states of the second and third vehicles 102 and 103. That is, if the speeds of the second and third vehicles 102 and 103 abruptly drop, the driver of the first vehicle 101 may consider this condition as that the second and third vehicles 102 and 103 have an accident. When a message generated according to a request from a driver of the first vehicle 101 is a message related to an accident occurred at a forward area, drivers of the second and third vehicles 102 and 103 can prepare against the accident.

According to the present embodiment, drivers or mobile station users can receive vehicle related information of another vehicle through a broadcasting service, prepare against accidents using the received vehicle related information, and understand overall traffic flow. Particularly, since the drivers or the mobile station users use vehicle related information of predetermined vehicles in a cell managed by a base station unlike the related art, the drivers can prepare for sharp corner or blind spots. Therefore, it is possible to reduce an accident occurrence probability. Further, the driver can advantageously select a driving path based on the traffic condition because the driver can detect overall traffic flow in predetermined cells. Therefore, a driver can conveniently drive a vehicle using the vehicle related information according to the present embodiment.

Although it is not shown in FIG. 1, a pedestrian can also be a mobile station user. When the pedestrian is at a crosswalk around a base station 100, drivers of the first to third vehicles 101 to 103 can detect a location of the pedestrian. Therefore, the drivers can carefully drive vehicles. On the contrary, the pedestrian can receive vehicle related information for around first to third vehicles 101 to 103 and detects the locations of the first to third vehicles 101 to 103. Therefore, the pedestrian may avoid traffic accident.

As described above, the method for transmitting and receiving broadcasting service information according to the present embodiment enables a mobile station user such as a driver of a vehicle or a pedestrian to use the vehicle related information by receiving vehicle or pedestrian related information from a mobile station through a mobile communication network and broadcasting the received vehicle or pedestrian related information. Accordingly, the method for transmitting and receiving broadcasting service information according to the present embodiment enables a driver to conveniently and safely drive a vehicle and reduces an accident occurrence probability.

Figure 2:
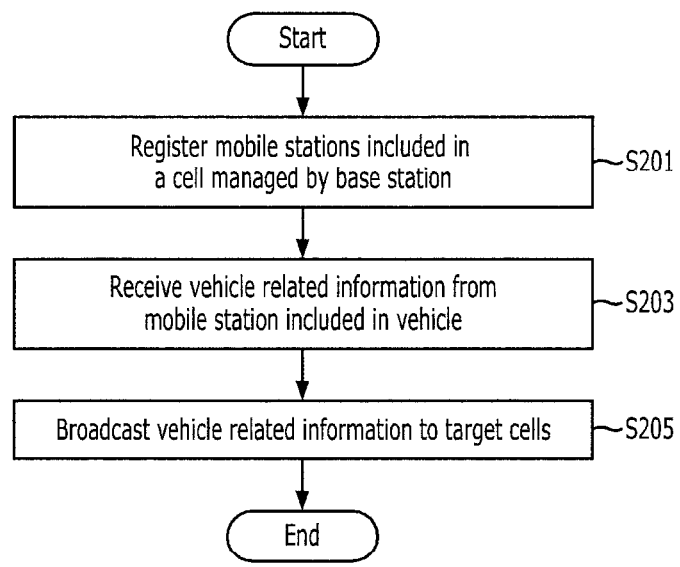
FIG. 2 is a flowchart for a method for transmitting broadcasting service information at a base station 100 in accordance with an embodiment of the present invention.

FIG. 2 is a flowchart illustrating a method for transmitting broadcasting service information at a base station 100 in accordance with an embodiment of the present invention. The flowchart of FIG. 2 describes a method for transmitting broadcasting service information when a mobile station is included in a vehicle.

Referring to FIG. 2, at step S201, the base station 100 registers mobile stations in a cell managed by the base station 100. The base station 100 provides various serviced to the cell. By registering the mobile stations, the mobile stations become enable to receive broadcasting service information transmitted from the base station 100. Further, the mobile stations subscribe a broadcasting service according to the present embodiment by registering to the base station 100.

At step S203, the base station 100 receives vehicle related information from a mobile station mounted at a vehicle. Here, the vehicle related information includes at least one of vehicle location information, vehicle driving state information, and message information generated according to a request of a mobile station user. The vehicle location information may be information generated by a global positioning system (GPS).

At step S203, the base station 100 broadcasts the received vehicle related information to target cells. The base station 100 may broadcast the vehicle related information as a broadcasting message type. The target cells may include at least one of the cell of the base station 100 and neighbor cells managed by base stations separated from the base station 100 within a predetermined distance. In detail, the base station 100 may provide a broadcasting service to vehicles in a corresponding cell as described in FIG. 1. The base station 100 may receive vehicle related information from vehicles in an own cell and broadcast the received vehicle related information to target cells by transmitting the received vehicle related information to neighbor base stations separated from the base station 100 within a predetermined distance.

The method for transmitting broadcasting service information according to the present embodiment enables a mobile station user to safely and conveniently drive a vehicle and to detect a traffic condition including accidents around a current location using the vehicle related information transmitted to mobile stations. The method for transmitting broadcast service information according to the present embodiment also enables a mobile station user to use vehicle related information of neighbor cells managed by base stations separated from the base station 100 within a predetermined distance. Therefore, it is possible to dynamically provide a broadcasting service according to a service range of a cell.

Although it is not described in FIG. 2, the method for transmitting broadcasting service information according to the present embodiment can be applied to a pedestrian as described in FIG. 1. That is, the base station 100 registers mobile stations included in the own cell managed by the base station 100. Then, the base station 100 receives mobile station user related information generated by and transmitted from the mobile station. The base station 100 broadcasts the received mobile station user related information to target cells. The mobile station user related information includes at least one of user location information, user speed information, and message information generated by a request of a mobile station user.

Although the method for transmitting broadcasting service information according to the present embodiment was described in a view of a process, the method for transmitting broadcasting service information according to the present embodiment may be understood as operations of constituent elements in an apparatus. Therefore, each step of the method for transmitting broadcasting service information according to the present embodiment may be understood as operations of constituent elements included in a broadcasting service information transmitter such as a base station 100.

FIG. 3 is a flowchart illustrating a method for receiving broadcasting service information in accordance with an embodiment of the present invention. FIG. 3 describes a method for receiving broadcasting service information when a mobile station is included in a second vehicle 102.

As shown in FIG. 3, a mobile station receives vehicle related information of a first vehicle 101 from a base station 100 at step S301. That is, the mobile station collects vehicle related information broadcasted from the base station 100. The base station 100 may be a base station that the mobile station 101 is registered to.

At step S303, the mobile station determines validity of the vehicle related information according to a predetermined output condition. That is, the mobile station performs a following process S305 if the received vehicle related information coincides with the predetermined output condition. If not, the received vehicle related information may be discarded. The predetermined output condition may be a distance to the first vehicle 102 from a second vehicle 102 or a condition of a mobile station user to receive vehicle related information.

At step S309, the mobile station outputs vehicle related information according to the determination result of step S303. For example, the mobile station may output vehicle related information using an own output device such as a display device or a speaker. Further, the mobile station can output the vehicle related information to a display device or a speaker of a vehicle including the mobile station. The display device or the speaker of the vehicle can reproduce vehicle related information outputted from the mobile station.

The method for receiving broadcasting service information according to the present embodiment enables a driver of the second vehicle 102 to detect a current traffic condition, currently occurred accidents, or an accident occurrence probability using the outputted vehicle related information.

The step S303 may include steps S305 and S307.

At step S305, the mobile station generates location information of the second vehicle 102 using a location information generating device of the mobile station or a location information generating device of the second vehicle. The location information generating device of the mobile station included in the second vehicle 102 or the location information generating device of the second vehicle 102 may be a global positioning system (GPS). When the second vehicle 102 generates the location information of the second vehicle 102 using the location information generating device of the second vehicle 102, the location information of the second vehicle 102 may be location information inputted from the location information generating device of the second vehicle 102.

At step S307, the mobile station determines whether the first vehicle 101 is located within a predetermined distance from the second vehicle 102 using location information of the first and second vehicles 101 and 102. If the first vehicle 101 is located within the predetermined distance from the second vehicle 102 as the determination result, the mobile station outputs vehicle related information of the first vehicle 101 at step S309.

Although it is not shown in FIG. 3, the mobile station may determine whether the received vehicle related information coincides with a predetermined receiving condition or not. For example, if the predetermined receiving condition is 'receiving accident related information', the mobile station may select accident related information from the received vehicle related information. At step S309, the mobile station may output only the accident related information. Further, the predetermined receiving condition may be intention to receive information about a predetermined vehicle included in a cell.

In these cases, the vehicle related information transmitted from the base station 100 may include an identifier (ID) for a type of vehicle related information or a vehicle. The mobile station may use the ID to determine whether the receiving condition coincides with the receiving condition or not.

Although it is not described in FIG. 3, the method for receiving broadcasting service information according to the present embodiment further includes receiving driving state information of the second vehicle 102 transmitted from the second vehicle 102 and transmitting at least one of location information of the second vehicle 102 generated by a location information generating apparatus of the second vehicle 102 or by a location information generating device of a mobile station included in the second vehicle 102, message information generated by a request of a user of a mobile station included in the second vehicle 102, and the driving state information. As described above, the mobile station of the second vehicle 102 transmits the vehicle related information of the second vehicle 102 according to the present embodiment. Therefore, drivers of first and third vehicles 101 and 103 can receive vehicle related information of the second vehicle 102.

Further, the mobile station may transmit at least one of location information, message information, and driving state information to a base station 100 according to a predetermined transmission condition or a transmission period. Also, the mobile station transmits location information including an identifier (ID) of the second vehicle 102 and a type of vehicle related information, message information, and driving state information to the base station 100 according to the present embodiment. Accordingly, drivers of first and third vehicles 101 and 103 can determine that the received vehicle related information is for the second vehicle 102.

As described above, the method for receiving broadcasting service information according to the present embodiment can be applied when the mobile station user is a pedestrian as described with FIG. 1. A first mobile station generates a first mobile station user related information. Then, the first mobile station transmits the first mobile station user related information to the base station 100. The first mobile station receives second mobile station user related information from a base station. Here, the mobile station user related information includes at least one of user location information, user speed information, and user message information. When the mobile station user is driving a vehicle, the user related information may be information about vehicles including the first and second mobile stations.

FIG. 4 is a diagram illustrating a mobile station 400 in accordance with a first embodiment of the present invention. In FIG. 4, the mobile station 400 is included in a second vehicle 102.

As shown in FIG. 4, the mobile station 400 according to the present embodiment includes a broadcasting information receiver 401, a data processor 403, and an output unit 411.

The broadcasting information receiver 401 receives vehicle related information about the first vehicle 101 from the base station 100. The vehicle related information is transmitted through a mobile communication network. The mobile communication network may be a $3^{rd}$ generation partnership project (3GPP) based on mobile communication network.

The data processor 403 determines validity of the received vehicle related information according to a predetermined output condition. If the vehicle related information coincides with the predetermined output condition, the data processor 403 approves the validity of the vehicle related information. The predetermined output condition may be a distance to the first vehicle from the second vehicle 102 or a receiving condition of a user of a mobile station 400. The data processor 403 may include a location information receiver 405, a distance determining unit 407, and a receiving condition determining unit 409. It will be described in detail in later.

The output unit 411 outputs the vehicle related information according to the determination result of the data processor 403. That is, the output unit 411 outputs the vehicle related information if the validity of the vehicle related information is approved according to the determination result of the data processor 403. The output unit 411 may be a display device or a speaker of the mobile station 400. The output unit 411 may output the vehicle related information received at the broadcasting information receiver 401 according to the determination result of the data processor 403.

Further, the output unit 411 may output the vehicle related information to a display device or a speaker of a vehicle where the mobile station 400 is mounted. The display device or the speaker of the vehicle may reproduce the received vehicle related information from the output unit 411.

As described above, the data processor 403 of the mobile station 400 may include a location information receiver 405 and a distance determining unit 407.

The location information receiver 405 receives location information of the second vehicle 102 inputted from the second vehicle 102 or generated by a location information generating device. The location information generating device may be a global positioning system (GPS).

The distance determining unit 407 determines whether the first vehicle 101 is located within a predetermined distance from the second vehicle 102 using location information of the first and second vehicles 101 and 102. If the first vehicle 101 is located within the predetermined distance from the second vehicle 102 as the determination result, the output unit 411 outputs vehicle related information of the first vehicle 101.

The data processor 403 may further include a receiving condition determining unit 409. The receiving condition determining unit 409 determines whether the vehicle related information coincides with the predetermined receiving condition or not when the first vehicle 101 is located within the predetermined distance. For example, the predetermined receiving condition may be information about a type of vehicle related information or vehicle related information for a target vehicle. When a receiving condition set by the mobile station 400 is 'receiving accident related information', the receiving condition determining unit 409 selects accident related information from the received vehicle related information. Further, the receiving condition determining unit 409 determines whether the vehicle related information is for a target vehicle or not when the predetermined receiving condition is a receiving condition for receiving vehicle related information about a target vehicle included in a corresponding cell.

In these cases, vehicle related information broadcasted from the base station 100 may include information an identifier (ID) about a type of vehicle related information or a vehicle. The mobile station 400 uses the ID to determine whether the vehicle related information coincides with the receiving condition.

As shown in FIG. 4, the mobile station 400 according to the present embodiment may further include a driving state information receiver 413 and a broadcasting information transmitter 415.

The driving state information receiver 413 receives driving state information from sensors of the second vehicle 102. That is, the driving station information receiver 413 collects driving station information from the sensors of the second vehicle 102 as vehicle related information. For example, the driving state information may be a speed of a vehicle or a driving direction, which are measured by sensors. The driving state information may be transmitted to the base station 100 through the broadcasting information transmitter 415.

The broadcasting information transmitter 415 also transmits location information of the second vehicle 102 and message information generated by a request of a user of the mobile station included in the second vehicle 102 as well as the driving state information. The location information of the second vehicle may be generated by a GPS included in the mobile station 400. The broadcasting information transmitter 415 may transmit the location information with an ID according to a type of vehicle related information and a vehicle type.

The broadcasting information transmitter 415 may transmit at least one of location information, message information, and driving state information to the base station 100 according to a predetermined transmission condition or a transmission period. That is, the mobile station 400 stores the location information, the message information, and the driving state information, and transmits at least one of the stored information to the base station 100 through the broadcasting information transmitter 415 according to the predetermined transmission condition or the transmission period.

Figure 5:
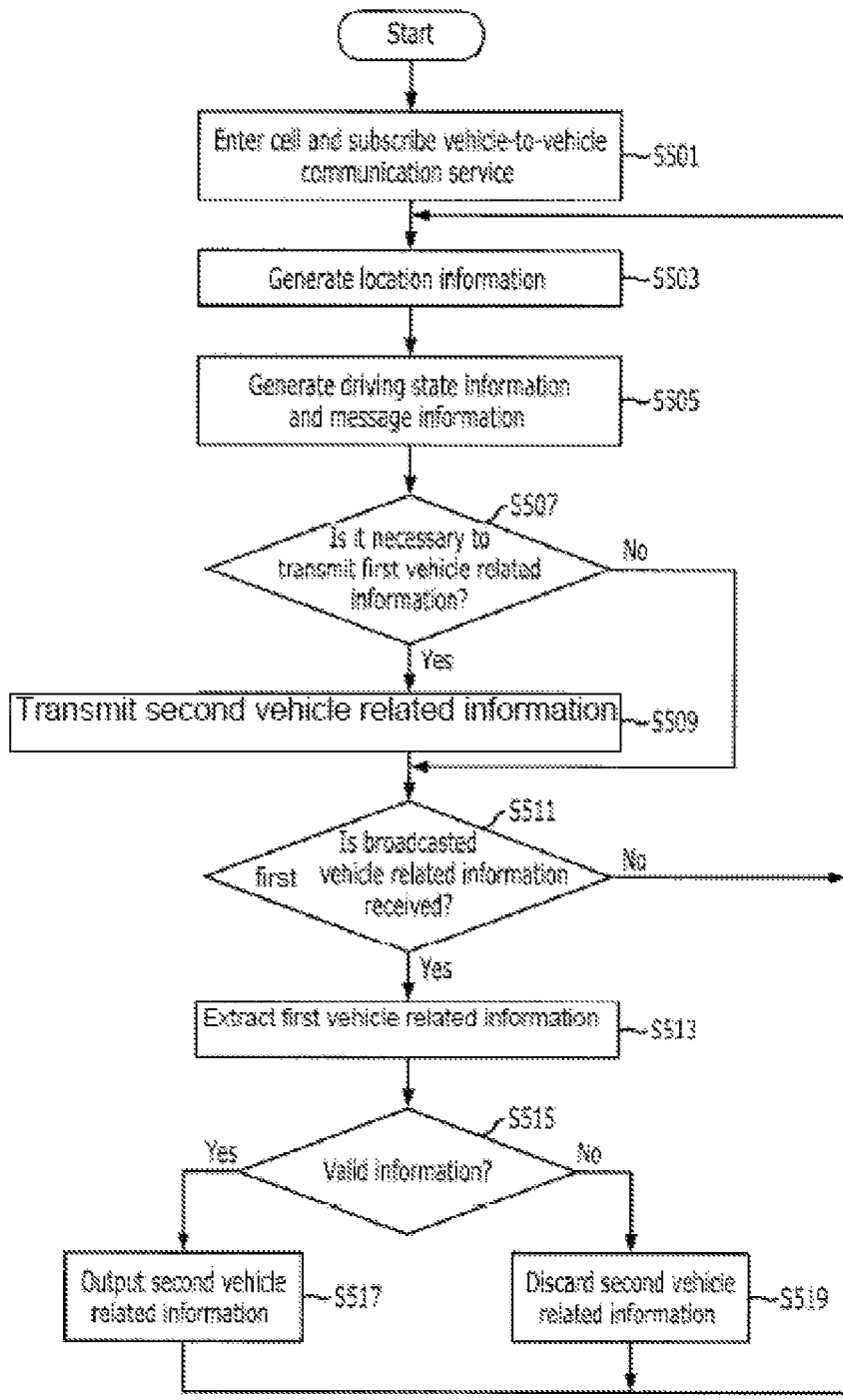
FIG. 5 is a flowchart for describing for a broadcasting service in accordance with an embodiment of the present invention.

FIG. 5 is a flowchart illustrating a method for providing a broadcasting service in accordance with an embodiment of the present invention. A method for transmitting and receiving a broadcasting service according to the present embodiment can be applied to a vehicle-to-vehicle communication service. The flowchart of FIG. 5 describes a broadcasting service for vehicle-to-vehicle communication including a mobile station. A mobile station of FIG. 5 is a mobile station included in a second vehicle 102.

When a vehicle having a mobile station enters a cell managed by a base station 100, the base station 100 registers the mobile station to subscribe a vehicle-to-vehicle communication service at step S501. At step S503, the mobile station generates location information of the second vehicle 102. At step S505, the mobile station also generates driving state information and message information. The driving state information may be inputted from the second vehicle 102 and the message information may be generated by a request of a user of the mobile station. The mobile station determines whether it is necessary to transmit second vehicle related information such as location information of the second vehicle 102, driving state information, or message information at step S507. If it is necessary to transmit, the mobile station transmits the second vehicle related information to the base station 100 through a mobile communication network at step S509. Here, the mobile station may transmit an identifier (ID) according to a type of information and a type of a vehicle with the second vehicle related information.

If information transmitted from the base station 100 includes first vehicle related information at step S511, the mobile station extracts the first vehicle related information from the received information at step S513. Here, the mobile station may extract the first vehicle related information using an identifier (ID) included in the first vehicle related information. Further, the mobile station may extract information about an information type and a vehicle type. The mobile station determines whether the first vehicle related information is valid information or not at step S515. The mobile station may determine the validity of the first vehicle related information using the predetermined output condition such as a receiving condition of a user of the mobile station. At step S517, the mobile station outputs the first vehicle related information when the validity of the first vehicle related information is approved. If not, the mobile station discards the first vehicle related information at step S519.

As described above, the method for transmitting and receiving broadcasting service information according to the present embodiment enables a mobile station user such as a driver to use the vehicle related information by receiving vehicle related information from a vehicle through a mobile communication network and broadcasting the received vehicle related information. Accordingly, the method for transmitting and receiving broadcasting service information according to the present embodiment enables a driver to safely and conveniently drive a vehicle. Further, it is possible to reduce an accident occurrence probability significantly.

Meanwhile, the method for transmitting and receiving broadcasting service information according to the present embodiment can be realized as a program and stored in a computer-readable recording medium such as CD-ROM, RAM, ROM, floppy disks, hard disks, magneto-optical disks, and the like. Since the process can be easily implemented by those skilled in the art to which the present invention pertains, further description will not be provided herein.

The present application contains subject matter related to Korean Patent Application No. 2008-0107312, filed in the Korean Intellectual Property Office on Oct. 30, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. A method for transmitting broadcasting service information at a base station, comprising:
   registering a mobile station in a cell, wherein the cell is a cell managed by the base station;
   receiving vehicle related information from the mobile station, wherein the mobile station is carried by a vehicle located in the cell; and
   broadcasting the received vehicle related information to one or more other mobile stations located in one or more target cells,
   wherein the one or more target cells comprise at least one of the cell and one or more neighbor cells managed by one or more neighbor base stations,
   wherein the one or more neighbor base stations are located within a determined distance from the base station, and
   wherein the broadcasted received vehicle related information comprises an identifier to identify a type of information in the vehicle related information and to be used to determine whether a receiving condition of the one or more other mobile stations is satisfied.

2. The method of claim 1, wherein the vehicle related information further comprises at least one of vehicle location information of the vehicle, vehicle driving state information of the vehicle, or message information generated according to a request of a user of the mobile station.

3. A method for transmitting broadcasting service information at a base station, comprising:
   registering a mobile station in a cell, wherein the mobile station is operated by a pedestrian, and wherein the cell is a cell managed by the base station;
   receiving pedestrian related information that is generated by and transmitted from the mobile station of the pedestrian; and
   broadcasting the pedestrian related information to a plurality of other mobile stations located in the cell,
   wherein the pedestrian related information comprises at least one of pedestrian location information of the pedestrian, pedestrian speed information of the pedestrian, or vehicle related information that is about a vehicle and generated by a request of the pedestrian.

4. A method for receiving broadcasting service information at a second mobile station, comprising:
   receiving first vehicle related information about a first vehicle broadcasted from a base station, wherein the first vehicle related information originated from a first mobile station located in a cell managed by the base station;
   determining that the first vehicle related information is valid based on a determined output condition; and
   outputting the received first vehicle related information at the second mobile station based on the determining that the first vehicle related information is valid,
   wherein the second mobile station is located in the cell or a neighboring cell managed by a neighbor base station located within a determined distance from the base station.

5. The method of claim 4, wherein the first vehicle related information comprises first vehicle location information of the first vehicle, and first vehicle driving state information of the first vehicle or first vehicle message information generated from the first mobile station.

6. The method of claim 5, wherein the determining that the first vehicle related information is valid comprises:
   determining a location of the first vehicle based on the first vehicle related information;
   determining the location of the second mobile station using a location information generating device of the second mobile station or a location information generating device of a second vehicle that carries the second mobile station; and
   determining that the first vehicle related information is valid based on determining that the location of the first vehicle is within a determined distance of the location of the second mobile station.

7. The method of claim 6, wherein the determining that the first vehicle related information is valid is based on:

determining that the first vehicle related information coincides with a determined receiving condition in addition to the determining that the location of the first vehicle is within the determined distance of the location of the second mobile station.

8. The method of claim 4, further comprising:
receiving second vehicle driving state information of a second vehicle from the second vehicle, wherein the second mobile station is carried by the second vehicle; and
transmitting the second vehicle driving state information to the base station.

9. The method of claim 8, wherein the transmitting the second vehicle driving state information to the base station comprises transmitting the second vehicle driving state information to the base station according to a transmission period or a determined transmission condition.

10. A method for receiving broadcasting service information, comprising:
generating, by a first mobile station, first vehicle related information about a first vehicle, wherein the first mobile station is carried by the first vehicle;
transmitting, by the first mobile station, the first vehicle related information to a base station; and
receiving, by the first mobile station and from the base station, second vehicle related information about a second vehicle, wherein the second vehicle related information originated from a second mobile station carried by the second vehicle,
wherein the first mobile station is located in a cell managed by the base station,
wherein the second mobile station is located in the cell or a neighboring cell managed by a neighbor base station located within a determined distance from the base station, and
wherein the received second vehicle related information comprises an identifier, the identifier to identify a type of information in the second vehicle related information, and to be used to determine whether a receiving condition of the first mobile station is satisfied.

11. The method of claim 10, wherein the first vehicle related information and the second vehicle related information comprise driving state information of the first and second vehicles, respectively.

12. A second mobile station, comprising:
a broadcasting information receiver configured to receive first vehicle related information about a first vehicle, broadcasted from a base station, wherein the first vehicle related information originated from a first mobile station located in a cell managed by the base station;
a data processor configured to determine that the first vehicle related information is valid based on a determined output condition; and
an output unit configured to output the first vehicle related information based on the determining that the first vehicle related information is valid,
wherein the second mobile station is located in the cell or a neighboring cell managed by a neighbor base station located within a determined distance from the base station.

13. The second mobile station of claim 12, wherein the first vehicle related information comprises first vehicle location information of the first vehicle, and further comprises first vehicle driving state information of the first vehicle or first vehicle message information generated by the first mobile station.

14. The second mobile station of claim 13, wherein the data processor comprises:
a location information receiver configured to receive a location of the second mobile station which is generated from a location information generation device of the second mobile station or inputted from a second vehicle that carries the second mobile station; and
a distance detecting unit configured to determine whether a location of the first vehicle is within a determined distance of the location of the second mobile station.

15. The second mobile station of claim 14, wherein the data processor further comprises a receiving condition determining unit configured to determine whether the first vehicle related information coincides with a determined receiving condition.

16. The method of claim 4, wherein the first mobile station is carried by the first vehicle.

17. The second mobile station of claim 12, wherein the first mobile station is carried by the first vehicle.

* * * * *